(12) United States Patent
Cheng

(10) Patent No.: US 7,628,633 B2
(45) Date of Patent: Dec. 8, 2009

(54) ELECTRICAL CARD CONNECTOR

(75) Inventor: Yung-Chang Cheng, Tu-cheng (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 11/980,255

(22) Filed: Oct. 30, 2007

(65) Prior Publication Data

US 2008/0102679 A1    May 1, 2008

(30) Foreign Application Priority Data

Oct. 30, 2006    (TW) .............................. 95219115 U

(51) Int. Cl.
H01R 13/62    (2006.01)
(52) U.S. Cl. ................... 439/325; 439/607.01; 439/159
(58) Field of Classification Search ................ 439/325, 439/159, 607, 607.01
See application file for complete search history.

(56) References Cited

U.S. PATENT DOCUMENTS

| | | | | |
|---|---|---|---|---|
| 6,059,586 A | * | 5/2000 | Watanabe et al. | 439/159 |
| 6,123,586 A | * | 9/2000 | MacDougall | 439/701 |
| 6,231,382 B1 | * | 5/2001 | Yu | 439/541.5 |
| 6,238,240 B1 | * | 5/2001 | Yu | 439/541.5 |
| 6,988,904 B1 | * | 1/2006 | Lai | 439/159 |
| 2006/0141857 A1 | | 6/2006 | Ting | |
| 2006/0194478 A1 | | 8/2006 | Ting | |

* cited by examiner

Primary Examiner—Tho D Ta
Assistant Examiner—Travis Chambers
(74) Attorney, Agent, or Firm—Andrew C. Cheng; Wei Te Chung; Ming Chieh Chang

(57) ABSTRACT

An electrical card connector has an insulating housing (10) receiving a plurality of terminals (12), a shell (11) mounted on the insulating housing, a guiding portion (15) located at one lateral side of the insulating housing, and a metal plate (4) locking with the guiding portion, wherein the guiding portion comprises a triangle plate (150) having a fastening portion, and the metal plate comprises a fastening section engaging with the fastening portion.

6 Claims, 5 Drawing Sheets the present invention is shown. The card connector comprises a first connector 1 for receiving an EXPRESS CARD, a second connector 2 for receiving a CARDBUS, a metal plate 4 located between the first connector 1 and the second connector 2, and a pair of screws 3 going through the first connector 1 and the second connector 2, respectively, to assemble both of them together as the card connector.

ELECTRICAL CARD CONNECTOR

BACKGROUND OF THE INVENTION

1. Field of the Invention

The present invention relates to an electrical card connector for accessing electrical cards, such as memory cards, and more particularly to an electrical card connector for receiving different cards.

2. Description of Prior Arts

As the development of the technology of electronics, more and more minitype electronic equipments turn up. Accordingly, many kinds of electrical card connector for saving the external space of minitype electronic equipments are appeared. These electrical card connectors can take less room than conventional electrical card connector, such as stacked electrical card connector.

In U.S. Patent Publication No. 2006/0194478, for example, a stacked electrical card connector adapted for accommodating two different cards includes a first connector, a second connector and a spacer located at the end of the stacked electrical card connector. Said first connector has a guiding section for guiding the card inserted, and a metal plate mounted under the guiding section. The guiding section includes a triangle plate located on the metal plate. However, there is no fastness provided between the guiding section and the metal plate. Therefore, a clearance may be existed because the guiding section is distorted, the metal plate is not flat enough or a tolerance is existed during assembling the stacked electrical card connector. As a result, the card will encounter an interference when it is inserted.

It is an object of the present invention to solve the above described problems. The present invention provides an electrical card connector which can reliably make the card be inserted stably.

SUMMARY OF THE INVENTION

An object, therefore, of the invention is to provide an electrical card connector, which can reliably make a card be inserted freely and stably.

To achieve the above object, an electrical card connector has an insulating housing receiving a plurality of terminals, a shell mounted on the insulating housing, a guiding portion located at one lateral side of the insulating housing, and a metal plate locking with the guiding portion, wherein the guiding portion comprises a triangle plate having a fastening portion, and the metal plate comprises a fastening section engaging with the fastening portion.

Other objects, advantages and novel features of the invention will become more apparent from the following detailed description of the present embodiment when taken in conjunction with the accompanying drawings.

DETAILED DESCRIPTION OF THE PREFERRED EMBODIMENT

Figure 1:
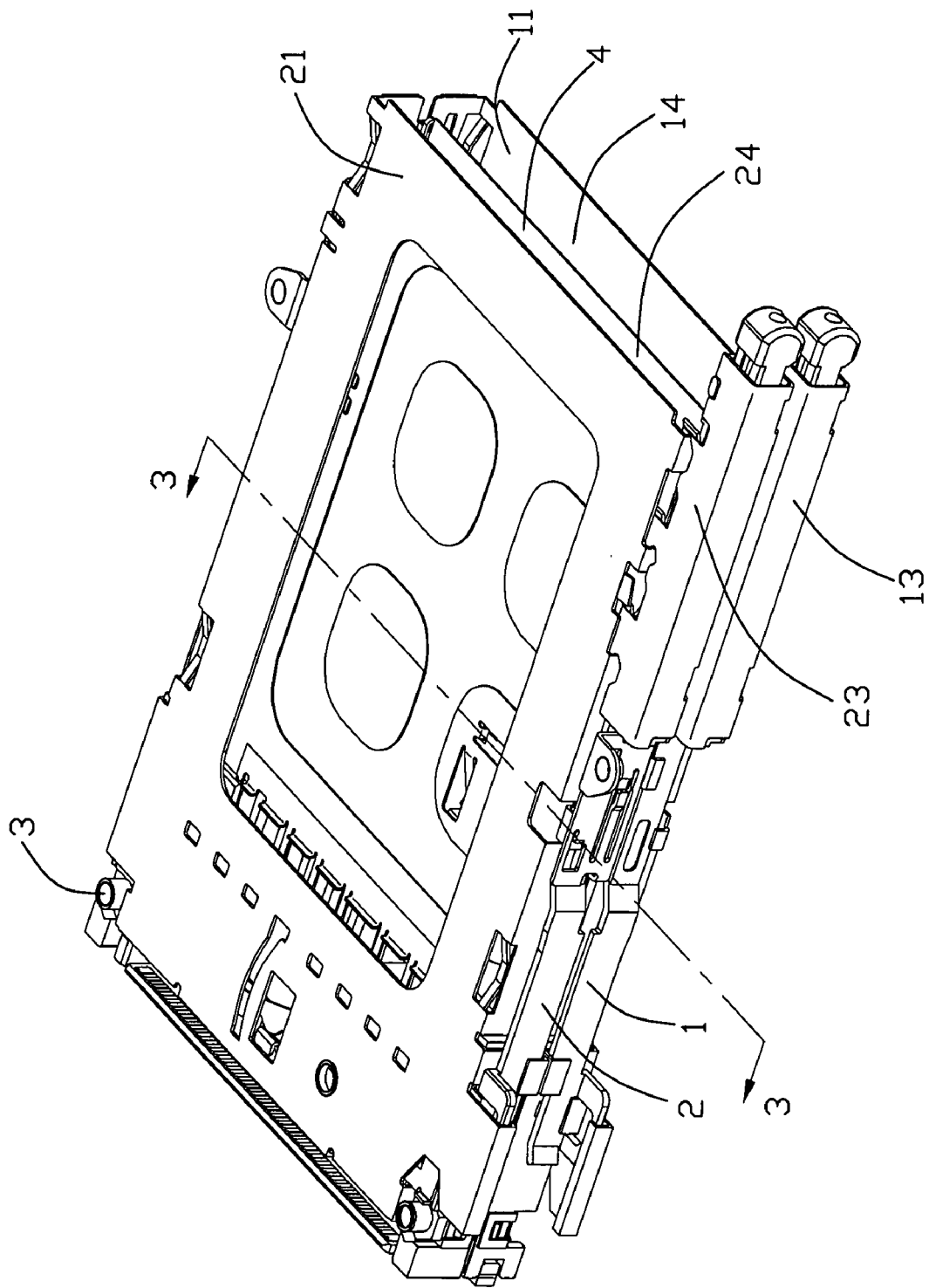
FIG. 1 is a perspective, assembly view of an electrical card connector in accordance with the present invention.

Referring to FIG. 1, a perspective, assembly view of a new and improved electrical card connector in accordance with the present invention is shown. The card connector comprises a first connector 1 for receiving an EXPRESS CARD, a second connector 2 for receiving a CARDBUS, a metal plate 4 located between the first connector 1 and the second connector 2, and a pair of screws 3 going through the first connector 1 and the second connector 2, respectively, to assemble both of them together as the card connector.

Figure 2:
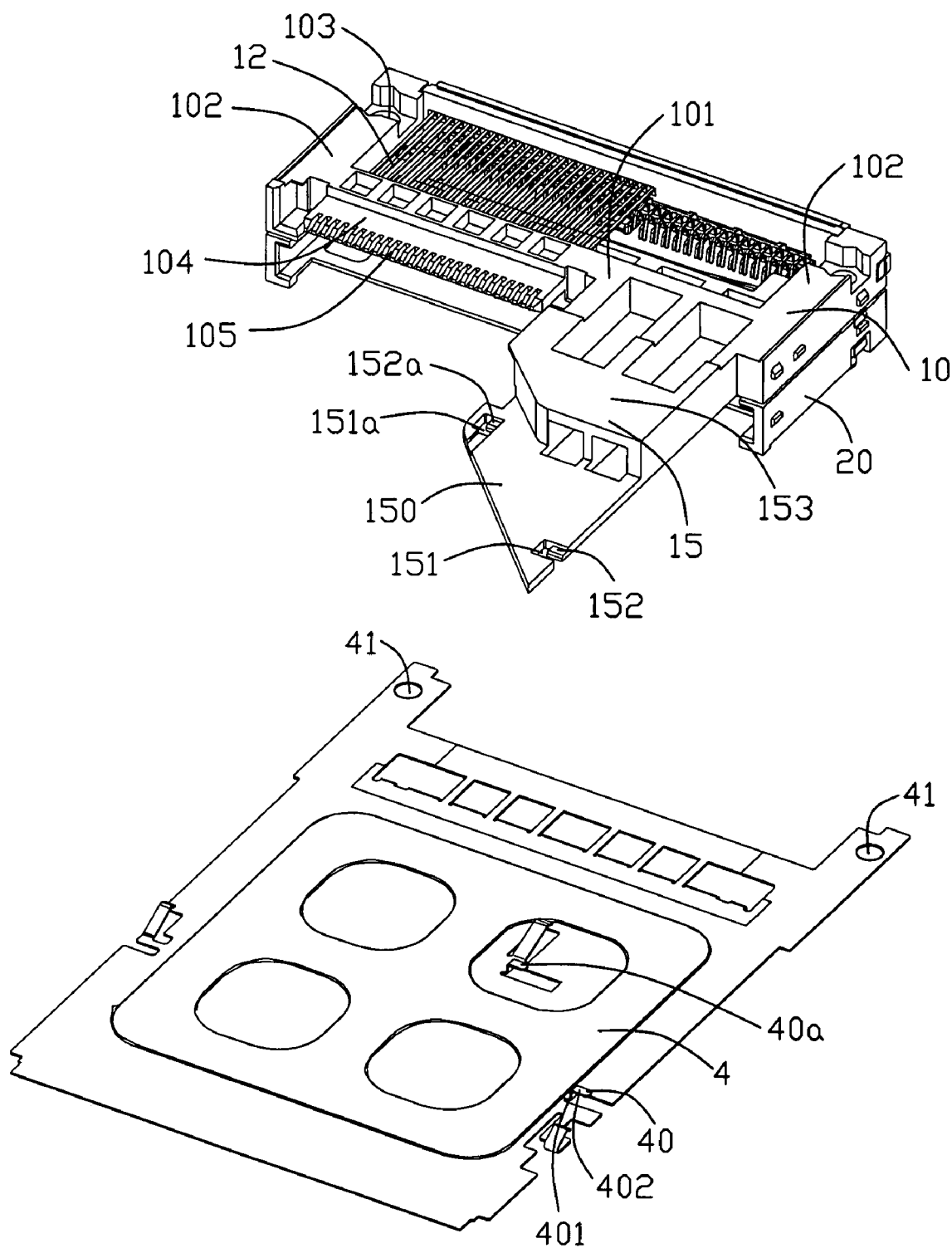
FIG. 2 is an exploded perspective view of a first insulating housing and a metal plate of the electrical card connector.
Figure 3:
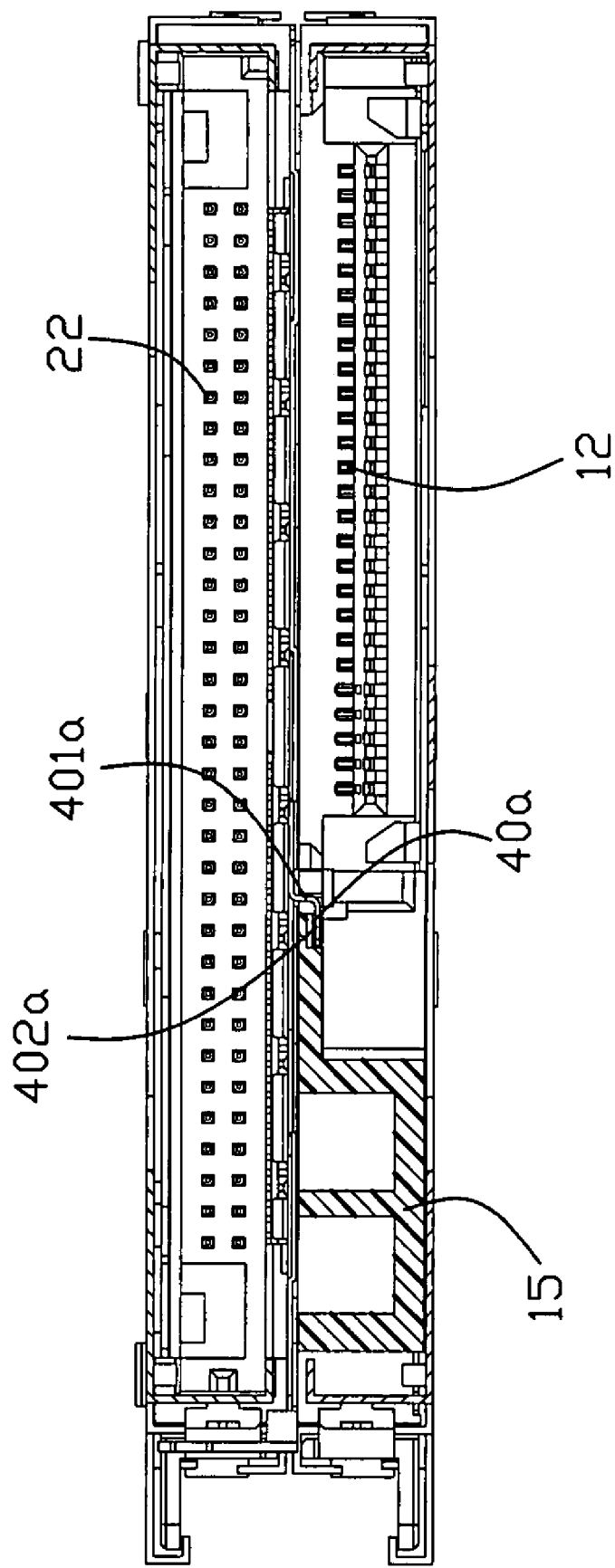
FIG. 3 is a cross section view of the electrical card connector taken along line 3-3 in FIG. 1.

In FIG. 2 and FIG. 3, the exploded view and the cross section view of the first connector 1 are shown. Said first connector 1 adapted for selectively receiving an I-shaped or an L-shaped card is provided with a first insulating housing 10 retaining a plurality of first terminals 12, a first shell 11 fitted on the first insulating housing 10, an ejecting member 13, and a guiding portion 15 for guiding the first card inserted. Relative to a printed circuit board (PCB), the first connector is mounted on the second connector 2.

A first receiving room 14, configured of an L-shaped, is defined by the first insulating housing 10, the first shell 11 and the metal plate 4. The first insulating housing 10 further includes a transverse base section 101, a pair of arms 102 extending from the opposite heads of the base section 101, and an engaging portion 104 with a number of terminal passageways 105. The engaging portion 104 extends from the base section 101 in a front-to-back direction between the arms 102 of the insulating housing 10. At each head of the arms 102, a pair of screw holes 103 are defined for the screws 3 going through, respectively.

The guiding portion 15 extending backwardly from one side of the base section 101 includes a body section 153 and a triangle plate 150. The body section 153, connecting the base section 101 with the triangle plate 150, extends upwardly from the triangle plate 150. A long side of the triangle plate 150 is opposite to the first insulating housing 10 to guide an inserted card. When the card is inserted into the first receiving room 14, the body section 153 can prevent the card from being inserted overly and breaking the first terminals 12.

Furthermore, two fastening holes 151 and 151a are defined on the opposite edges of the triangle plate, and one side of the fastening hole 151 is opening, but the other fastening hole 151a is closing. The fastening hole 151a is adjacent to the engaging portion 104 and retained in the first receiving room 14, and the fastening hole 151 is located at the front section of one arm 102 of the insulating housing 10. Two steps 152 and 152a are formed at one side of the fastening holes 151 and 151a, facing the first receiving room 14, respectively.

Referring now to FIG. 2 and FIG. 3, the metal plate 4 is adapted to hold up the inserted card. Corresponding to the fastening holes 151 and 151a of the triangle plate 150, two locking tabs 40 and 40a are set on the metal plate to lock with the fastening holes 151 and 151a, respectively. Such design can keep the metal plate 4 and the guiding portion 15 assembled fast to each other, avoiding a gap between the metal plate 4 and the triangle plate 150. Additionally, the locking tabs 40 and 40a each includes a vertical portion 401, 401a and a horizontal portion 402, 402a extending from the portion 401, 401a, respectively. At the lateral head of the metal plate 4, and corresponding to the screw hole 103 of the first insulating housing 10, a pair of mounting holes 41 are defined for the screws 3 to pass through.

As shown in FIG. 1 to FIG. 3, the second connector 2 comprises a second insulating housing 20 with a plurality of second terminals 22, a second shell 21 matching with the second insulating housing 20, and a second ejecting member 23 located on a lateral side thereof. Under the first receiving room 14, a second receiving room 24 is defined by the second insulating housing 20, the second shell 21, and the metal plate 4, so the first receiving room 14 and the second receiving room 24 are separated by the metal plate 4.

Figure 4:
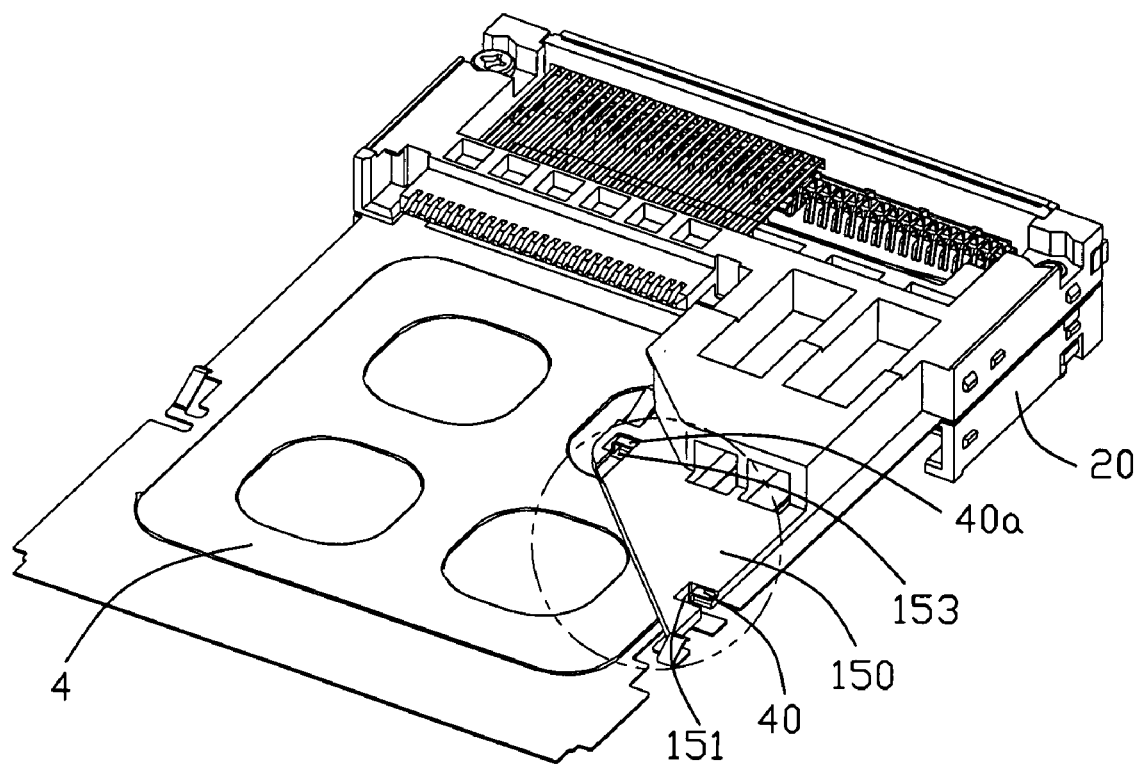
FIG. 4 is a perspective view of a guiding portion mounted on the metal plate.
Figure 5:
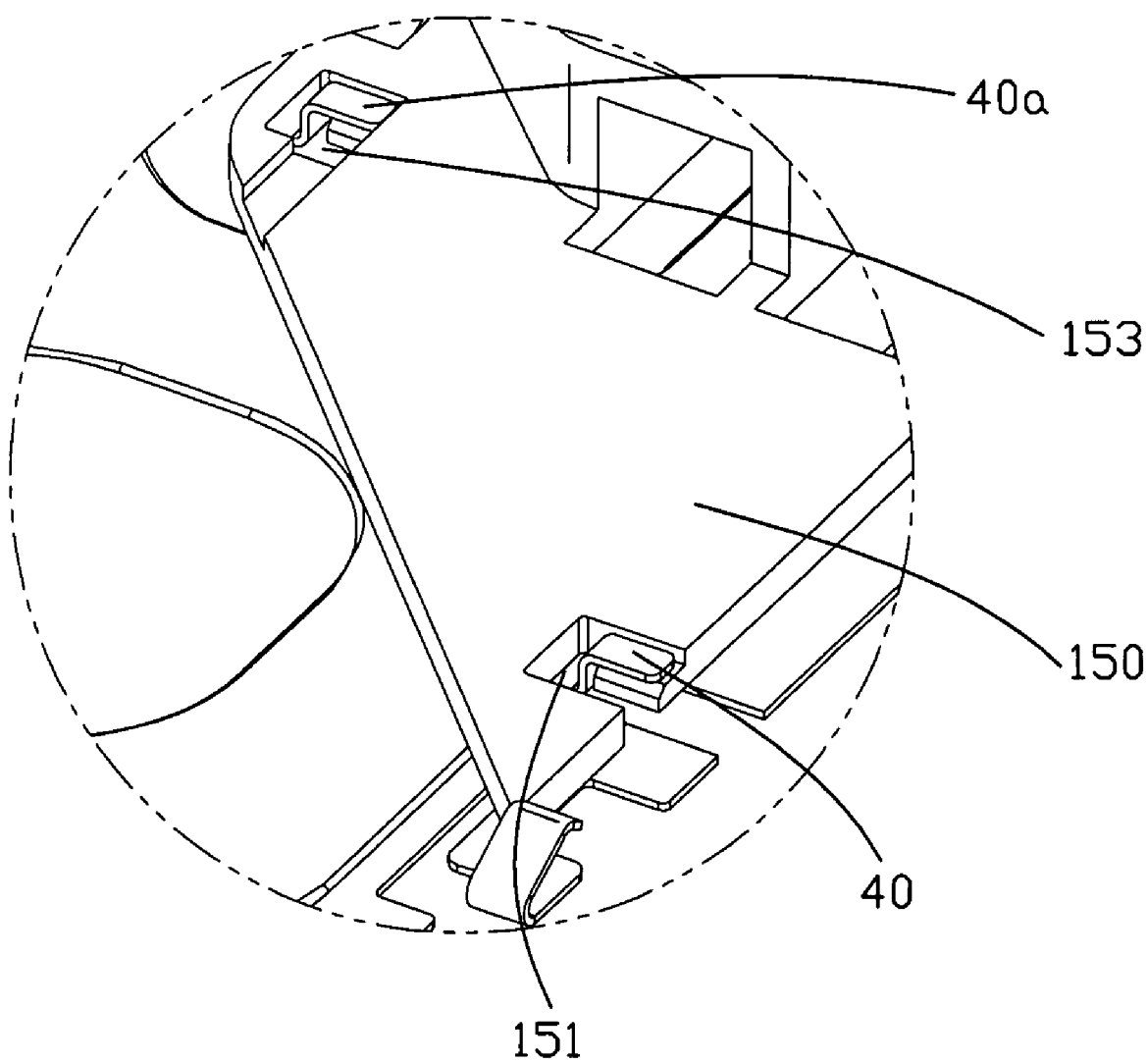
FIG. 5 is an enlarged view of the circled section in FIG. 4.

The relationship of the guiding portion 15 and metal plate 4 is shown in FIGS. 3 through 5. When the guiding portion 15 is mounted on the metal plate 4, the locking tabs 40 and 40a firstly go through the fastening holes 151 and 151a, and then move sidewardly, respectively. Thereafter the horizontal portion 402 and 402a engage with the step 152 and 152a of the triangular plate 150, respectively. The guiding portion 15 and the metal plate 4 assembled such that the guiding portion 15 fast to the metal plate 4 closely, in order to make sure a card be inserted stably and freely. Of course, there are other practices which can reach the above purpose. For example, a pair of locking tabs are formed on the triangular plate of the guiding portion, and a pair of fastening holes are defined on the metal plate according with the locking tabs of the triangular plate. In a word, any fastening member, between the guiding portion and the metal plate, which can make the guiding portion and the metal plate fast to each other, is covered by present invention.

As described above, the locking tabs 40 and 40' of the metal plate 4 are, locked with the steps 152 and 152' formed on the guiding section 15, respectively, to permit a card to be inserted more freely, and no interference bring out for the triangle plate 150 of the guiding portion 15 distortion, or assembling tolerance.

The practice described above, also can be used for an electrical card connector including a guiding portion and a metal plate locking with the guiding plate, selectively receiving a card.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

I claim:

1. An electrical card connector comprising:
   an insulating housing receiving a plurality of terminals;
   a shell mounted on the insulating housing;
   a guiding portion located at one lateral side of the insulating housing;
   a metal plate located underneath the guiding portion and the insulating housing to be parallel with the shell so as to define a card receiving space therebetween;
   wherein the guiding portion comprises a triangle plate having a fastening portion, and the metal plate comprises a fastening section extending towards the card receiving space to engage with the fastening portion; wherein
   the fastening portion of the triangle plate is a pair of fastening holes; wherein
   the fastening section of the metal plate is a pair of locking tabs engaging with the fastening holes of the triangle plate; wherein
   each fastening hole of the triangle plate forms a step, and the steps are locked with the locking tabs of the metal plate, respectively, wherein
   one fastening hole of the triangle plate is open on one edge of the triangle plate, and the other is closed on another edge of the triangle plate.

2. The electrical card connector as claimed in claim 1, wherein each locking tab of the metal plate comprises a vertical portion and a horizontal portion extending from the vertical portion, the horizontal portion engaging with the step.

3. The electrical card connector as claimed in claim 1, wherein the guiding portion extends backwardly from the insulating housing.

4. The electrical card connector as claimed in claim 1, further comprising a second connector mounted under the metal plate, and wherein the second connector comprises a card receiving room.

5. An electrical card connector comprising:
   an insulative housing defining a guiding portion for guiding insertion of a card into a card receiving space defined by the housing and metallic shell which is fastened to the housing; and
   a plurality of contacts disposed in the housing and extending into the card receiving space; wherein
   the shell unitarily includes a fastening section extending towards the card receiving space and engaged with a step formed on the guiding portion so that the fastening section cooperates with another portion of the shell to sandwich the step therebetween in a vertical direction; wherein
   said fastening section is of a vertically L-shaped configuration; wherein
   said step is located in a fastening hole in the guiding portion; wherein
   said fastening hole forms a lying L-shaped slot beside said step in a top view; wherein
   said lying shaped slot is dimension to allow the fastening section to pass therethrough in a vertical direction from an exterior and successively moved in a horizontal direction for engagement with the step.

6. The electrical card connector as claimed in claim 5, wherein said guiding portion is of a triangular form.

* * * * *